Sept. 4, 1956   H. A. SCHLATTER ET AL   2,761,951
INDICATING APPARATUS FOR FLASH WELDING MACHINES
Filed June 10, 1954
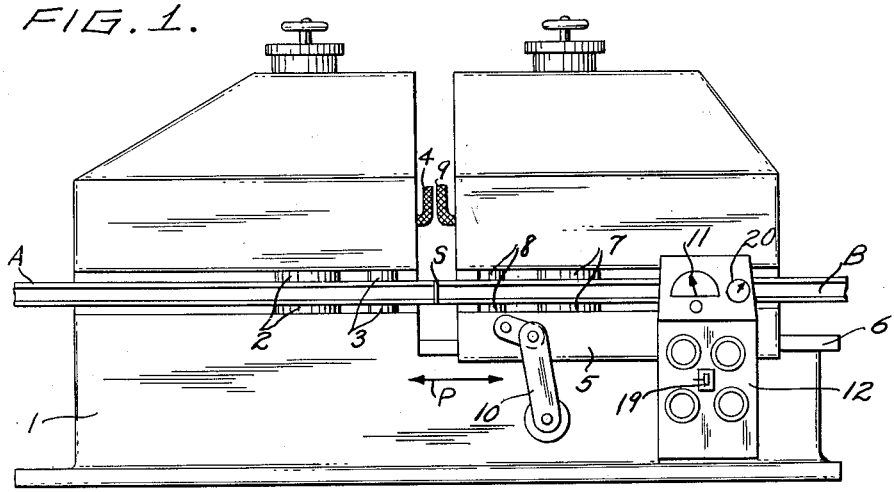
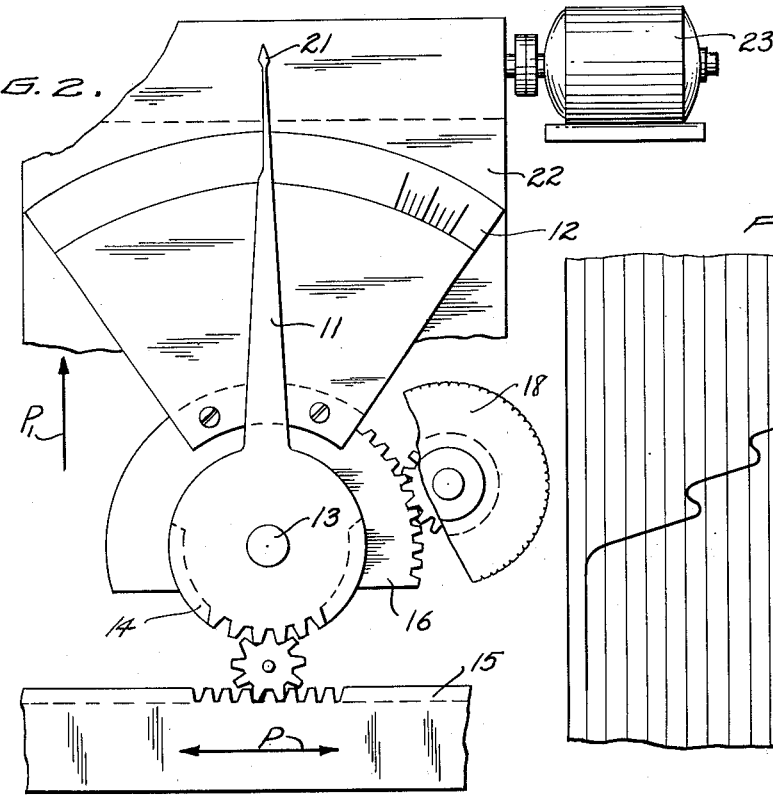
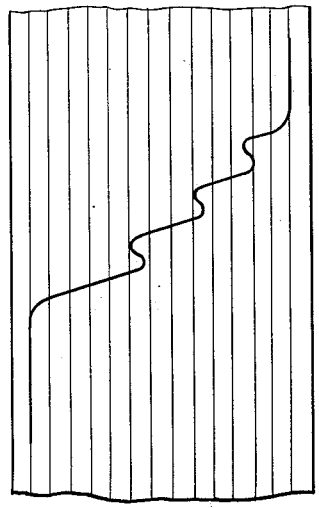
INVENTORS:
HANS ALFRED SCHLATTER
AND EMIL WEGMANN
BY

United States Patent Office 2,761,951
Patented Sept. 4, 1956

2,761,951

INDICATING APPARATUS FOR FLASH WELDING MACHINES

Hans Alfred Schlatter and Emil Wegmann, Zollikon-Zurich, Switzerland, assignors to Firma H. A. Schlatter A. G., Zollikon-Zurich, Switzerland Application June 10, 1954, Serial No. 435,844

Claims priority, application Switzerland January 8, 1954

1 Claim. (Cl. 219—97)

The present invention relates to welding machines and in particular to flash welding machines.

As is well known in flash welding machines the parts to be welded are brought together with current flowing therethrough and then separated slightly to create a flashing action which generates the greatest part of the heat for the welding process, the balance of the heat coming from the resistance at the joint. The contact and separation of the parts is repeated until the metal at the joint is sufficiently plastic, at which time a heavy pressure is suddenly applied forcing the parts against each other to produce the weld.

With known flash welding machines, it is important to move the parts to be welded into and out of contact with each other according to a predetermined rhythm and it is always difficult to know whether or not the welding of a pair of members has actually been or is being carried out according to the prescribed rhythm.

One of the objects of the present invention is to provide an apparatus which indicates to the operator the manner in which the welding process is proceeding, so that the operator can in this way know whether or not the desired operations are actually being carried out by the machine.

Another object of the present invention is to provide a means for recording the movements of the parts to be welded with respect to each other during the welding thereof.

A further object of the present invention is to provide an apparatus capable of accomplishing the above objects and at the same time being made up of simple and ruggedly constructed parts which are very reliable in operation.

With the above objects in view the present invention mainly consists of a flash welding machine which includes a support on which a carriage is mounted for reciprocating movement, this carriage being adapted to carry one of the articles to be welded. An indicating means is provided to indicate at an enlarged scale the movement of the carriage, this indicating means being connected to the carriage to be operated thereby. Also, the indicating means includes a means for recording the movements of the carriage.

The novel features which are considered as characteristic for the invention are set forth in particular in the appended claim. The invention itself, however, both as to its construction and its method of operation, together with additional objects and advantage thereof, will be best understood from the following description of specific embodiments when read in connection with the accompanying drawings, in which:

Fig. 1 is a schematic side elevational view of a flash welding machine which includes the structure of the invention;

Fig. 2 is a fragmentary schematic illustration of the details of the indicating means of the present invention; and Fig. 3 illustrates a part of a sheet on which movements of the carriage of the machine have been recorded.

The machine illustrated in Fig. 1 includes a base 1 on which one of the work pieces A is clamped by means of the members 2 and 3 and which is connected electrically to the conductor 4 which leads to the welding transformer, the actual electrical connections between conductor 4 and member A not forming part of the present invention and not being illustrated. The base 1 further carries a carriage 5 supported by the rails 6 of base 1 for reciprocating movement in the direction of arrows P of Fig. 1. The carriage 6 carries the second work piece B clamped to the carriage 6 with the members 7 and 8 and being connected electrically to the conductor 9. An unillustrated piston drive is provided to turn the lever 10 and through the latter to reciprocate the carriage 5 according to a predetermined rhythm to carry out the welding of members A and B to each other at the joint S.

In order to permit the operator to observe the operation of the machine, the latter is provided at its right hand edge portion, as viewed in Fig. 1, with an indicating means which renders the movement of the carriage 5 visible with the pointer 11 at an extremely enlarged scale which may for example be 10 to 1; that is, the pointer 11 moves through 10 times the distance that carriage 5 moves in this example. Beneath this indicating means, there is located the switchboard 12 which includes switch members for adjusting the automatic regulation of the contact pressure and contact times during the welding process as well as the upsetting time and the duration of current flow during the final upsetting stage of the welding process, and this switchboard is also provided with an ammeter 20 for measuring the current flow. A manually operable switch 19 is provided for starting the machine.

The above-mentioned indicating means is illustrated in detail in Fig. 2 from which it is evident that the pointer 11 is located in front of a scale 12. Pointer 11 is fixed to and extends from a gear 14 which is turnable on a stationary pin 13 of the machine, and scale 12 is fixed to a gear 16 which is also turnable about the stationary pin 13. The gear 14 meshes with a pinion which in turn meshes with a rack 15 fixed to the carriage 5 for movement therewith. A pinion 17 meshes with the gear 16, and a turning knob 18 is connected to the pinion 17 for turning the latter and forms the manually turnable means for turning pinion 17 and gear 16, and of course scale 12 therewith. Thus, by turning of knob 18 it is possible for the operator to locate the zero point of scale 12 at any desired position with respect to the pointer 11.

As soon as the work pieces A and B are clamped and properly positioned on the machine, the operator starts the machine with the hand switch 19. The latter energizes the welding transformer through suitable relays and also sets into operation the pneumatic or hydraulic drive for reciprocating carriage 5. As soon as the cold work pieces A and B contact each other for the first time the current flow may be seen at the ammeter 20. At this time the scale 12 is zeroed with respect to the pointer 11 by turning the knob 18, so that the scale 12 is zeroed with the pointer 11 at whatever position the latter happens to be in at the time when the work pieces contact each other for the first time, and in this way the starting point of the welding operation is set to be indicated with the means 11, 12. It should be noted that the carriage does not move very quickly, and in fact, moves at a rate of approximately 1 mm. per second, so that the operator can follow the movement of the pointer 11 by moving the scale 12 during zeroing thereof without interrupting the operation of the machine for zeroing the scale. Also, the first moment of contact is not only shown by the ammeter 20, but in addition the explosion produced by the first arcing between the members provides an aural indication of the contact between the work pieces.

As the welding process proceeds the pointer 11 moves further to the left from the zero point at each successive stroke, and it is thus a simple matter to observe whether or not the prescribed rhythm of operations is maintained. As soon as the work pieces have been heated sufficiently, the final upsetting thereof takes place and the pointer then moves steadily to the left until the end of the process.

When very expensive work pieces are welded such as, for example, crank shafts, it is worthwhile to record the movements of the pointer 11 so as to provide a document showing the welding process. For this purpose, the pointer 11 is provided with a writing instrument 21 which is fixed to the top end of pointer 11, as viewed in Fig. 2 and which records the movement of pointer 11 on a length of sheet material such as the strip of paper 22 which is located against the writing instrument 21 and which is slowly moved in the direction of arrow P, of Fig. 2, substantially along the length of the pointer 11 by a small motor 23 set into operation by the switch 19. Fig. 3 shows a part of the strip 22 which has an indication of the movement of carriage 5 recorded thereon.

It will be understood that each of the elements described above, or two or more together, may also find a useful application in other types of welding machines differing from the types described above.

While the invention has been illustrated and described as embodied in indicating apparatus for welding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a flash welding machine, in combination, a support; a carriage, for carrying an article to be welded, mounted on said support for reciprocating movement thereon; a rack fixed to said carriage for movement therewith; a pinion meshing with said rack; a gear carried by said support for turning movement about a predetermined axis and meshing with said pinion; a pointer fixed to and extending from said gear to indicate the movement of said rack at an enlarged scale; a second gear mounted on said support behind said first-mentioned gear for turning movement about said predetermined axis; a scale fixed to said second gear and located behind said pointer; a second pinion meshing with said second gear; and a manually operable member connected to said second pinion for turning the latter to turn said second gear and scale therewith for zeroing said scale with respect to said pointer.

References Cited in the file of this patent

UNITED STATES PATENTS

| 1,793,245 | Phelps | Feb. 17, 1931 |
| 1,938,499 | Ragsdale | Dec. 5, 1933 |

FOREIGN PATENTS

| 552,477 | Great Britain | Apr. 9, 1943 |
| 651,524 | Germany | Oct. 14, 1937 |